United States Patent

Fossum et al.

[15] 3,696,392

[45] Oct. 3, 1972

[54] CONVERSION DEVICE FOR DATA PRESENTATION ON TELEVISION SCREENS

[72] Inventors: Lars Fossum, Bromma; Lennart Wangberg, Jakobsberg, both of Sweden

[73] Assignee: International Standard Electric Corporation, New York, N.Y.

[22] Filed: April 29, 1971

[21] Appl. No.: 138,841

Related U.S. Application Data

[63] Continuation of Ser. No. 779,930, Nov. 29, 1968, abandoned.

[30] Foreign Application Priority Data

Dec. 6, 1967 Sweden ..................16737/67

[52] U.S. Cl. .........340/324 A, 340/152 R, 340/172.5

[51] Int. Cl. ..................................................G06f 3/14

[58] Field of Search..................................340/324 A

[56] References Cited

UNITED STATES PATENTS

| | | | |
|---|---|---|---|
| 3,426,344 | 2/1969 | Clark | 340/324 A |
| 3,230,514 | 1/1966 | Kliman | 340/172.5 |
| 3,400,377 | 9/1968 | Lee | 340/324 A X |

*Primary Examiner*—David L. Trafton

*Attorney*—Charles L. Johnson, Jr., Philip M. Bolton, C. Cornell Remsen, Jr., Isidore Togut, Walter J. Baum and Percy P. Lantzy

[57] ABSTRACT

An arrangement is provided for presentation of data received from a computer on a plurality of television screens. The arrangement includes a memory mans for storing in a delay line the coupled data which is circulated for representation on all of said television screens; and a number of row memories, one for each of the television screens, is coupled to the memory means and has a shift register in which the row data contents are circulated in an individual closed data loop a given number of times depending on the row resolution factor of the television image for line representation on a corresponding television screen. Another shift register is controlled from a central control unit and coupled to the row memories to extract each individual data row from the memory means, and each individual data row in a row memory is circulated synchronously with the repetition frequency of the line sweep of the television screen. The output generating means which is coupled to the screens presents each row of data in a consecutive sequence with a predetermined amount of presentation overlapping.

6 Claims, 3 Drawing Figures

Inventors
LARS FOSSUM
LENNART WÅNGBERG
By [signature]
Attorney

Inventors
LARS FOSSUM
LENNART WÅNGBERG
By [signature]
Attorney

Inventors
LARS FUSSUM
LENNART WÅNGBERG
By [signature]
Attorney

CONVERSION DEVICE FOR DATA PRESENTATION ON TELEVISION SCREENS

This application is a continuation of application Ser. No. 779,930, filed Nov. 29, 1968 and now abandoned.

BACKGROUND OF THE INVENTION

This invention refers to a conversion device for presentation of data derived from a computer on the screens of one or a plurality of television sets.

In a device of this type alpha-numerical characters are derived from a computer and presented on one or a plurality of screens with television deflection systems. The computer may be connected to the equipment either at a nearby point or at a remote point over a telephone line. Operators present at the screen may interrogate the computer over keyboards of typewriter type, wherein a response will occur on the screens or will alter data presented on the screens.

When television sets are utilized as output means, a memory is necessary with a computer connected at a remote point to store the information to be presented on the television screens. To provide a data row on an ordinary television screen it is necessary that the information of the data row be transformed to a number of horizontal line sweeps, these are then assembled on the screen so as to form a complete row image. The television deflection method presupposes that the entire row information is available during each line sweep.

The memories that are commonly utilized for this purpose are ferrite core memories, which due to their construction are very expensive. However, it is possible to extract data any number of times from defined addresses in these ferrite core memories.

SUMMARY OF THE INVENTION

According to this invention the utilization of such ferrite core memories is eliminated by the memory comprising a main memory of a delay line type and a row memory of a shift register type.

The cost for memory devices is substantially reduced by utilizing delay lines. This may be accomplished in two different ways. In one way, a single buffer memory in the form of a closed delay line is utilized and the total data content intended for presentation on all of the screens is circulated, such that each data row is repeated a given number of times, for example eight times for a data row resolution into eight individual lines. This way provides poor utilization of then storage volume of the buffer memory and it is therefore uneconomical. However, in accordance with the invention, there are connected the image memory and, depending on the number of television screens, additional dynamic row memories of a shift register type, each provided for storing a data row intended for representation on a television screen.

BRIEF DESCRIPTION OF THE DRAWINGS

The invention will be described more specifically below in the form of a preferred embodiment with reference to the accompanying drawings in which.

DESCRIPTION OF THE PREFERRED EMBODIMENT

Figure 1:
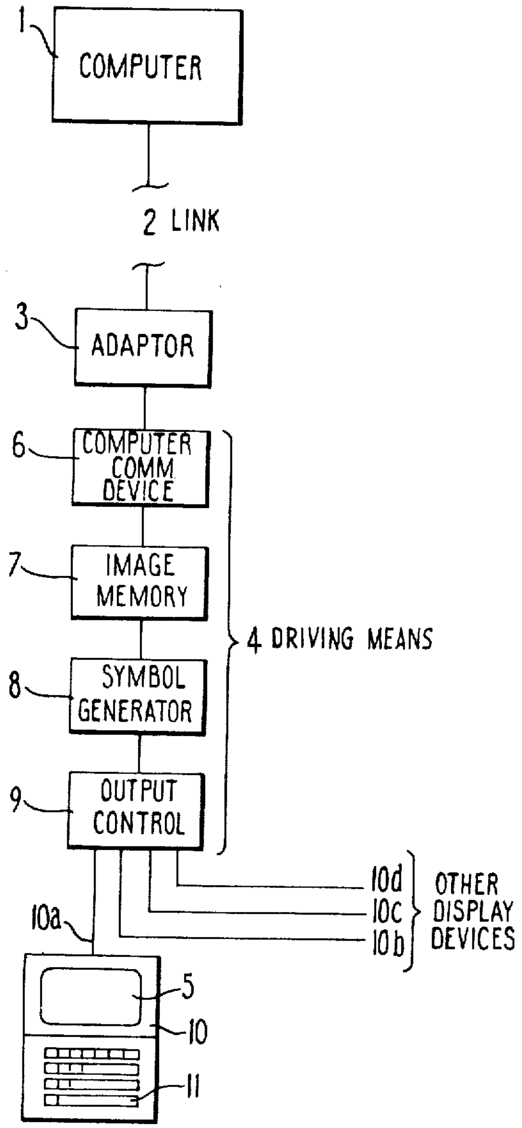
FIG. 1 shows in the form of a block diagram the individual units of the invention for data transmission between a computer and television screens.

FIG. 1 illustrates a computer 1 that may be connected either nearby or at a distance. From computer 1 data is transferred over a transmission link 2 in conventional manner to adapting means 3 and furthermore to driving means 4 intended for converting and controlling data so as to present the same in the desired form on television screens 5 (only one is illustrated in the figure). The driving means consist of four individual blocks comprising communicating devices 6 intended for communication with the computer, and acoustical delay memory (an image memory) 7, a symbol generator with a row memory 8 and communication means 9 intended for communication with the television screens 5. The term symbol generator refers to utilization of the same for generating the pertinent symbols, digits, letters and specific characters. A television receiver 10 with a keyboard 11 is connected to the means 9 provided for communication with the television screens. Three additional television sets may be connected by lines 10*b*, 10*c*, 10*d* to the television communication means 9 as is illustrated in FIG. 1.

Figure 2:
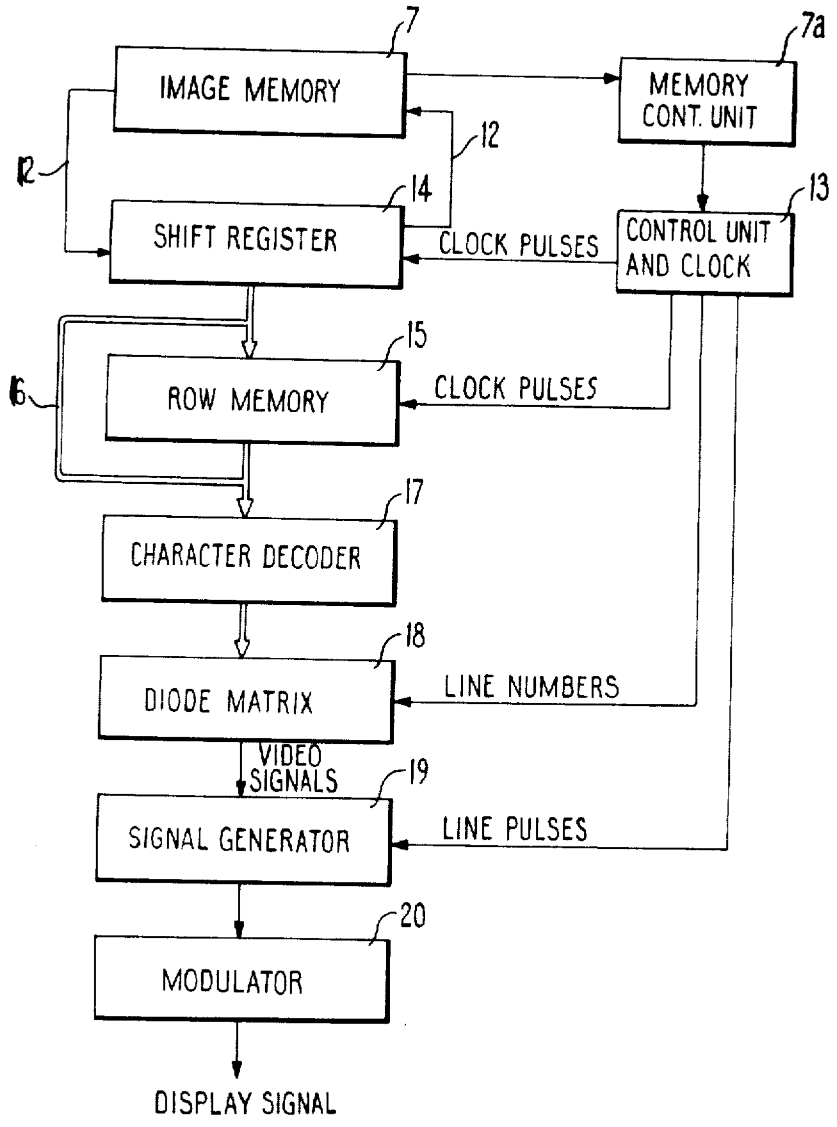
FIG. 2 shows the principle of using the specific memory means of the invention.

As shown in FIG. 2, the buffer memory 7 or "image memory" comprises a magnetostrictive delay line 12 in the form of a closed loop, which is adapted to store all data intended for presentation on all of the television screens 5. Clock pulses from a centrally located control unit 13 actuates a shift register 14 so that a data row to be represented on a television screen 5 may be supplied to a "row memory" 15 of shift register type. The data row contents of row memory 15 may now be circulated in a closed line loop 16 a given number of times in dependency of the row resolution factor of the television image. If the row resolution factor is eight, the data row is thus circulated eight times in the loop 16 synchronously with the repetition frequency of the line sweep of the television set. In normal television presentation with interlacing each data row is circulated four times for each half image. Therefore eight individual line sweeps are necessary for "writing" a data row on the screen. The data content is supplied from row memory 15 over a character decoder 17 to a matrix 18 controlled by the centrally located control unit 13. Matrix 18 provides video signals, which under the control of control unit 13 are sent from a television signal generator 19 to a modulator unit 20 for providing television input signals. If a television monitor is used, modulator unit 20 is dispensed with.

All television screens connected to the system may utilize the same symbol generator on a line multiplex basis. It should be pointed out that the data arrangement in the buffer memory is such, that the presentation of data on the screens (in this case four screens) is carried out in the following order: First data row 1 is presented on screen 1 and thereafter in a consecutive sequence data row 1 on screen 2, data row 1 on screen 3, data row 1 on screen 4, data row 2 on screen 1, etc. The disposition of the buffer memory may be seen more clearly from the following table which is given as an example. In the table the time per row in the image memory has been given as 200 microseconds.

| Screen No. | Row | Time in micro-Nosec. | OPERATION Screen 1 | Screen 2 | Screen 3 | Screen 4 |
|---|---|---|---|---|---|---|
| | | 0 | | | | |
| | | | Read-in | | | |
| 1 | 1 | 200 | Row 1 | | | |
| 2 | 1 | 400 | Present | Read-in 1 | | |
| 3 | 1 | 600 | Row 1 | Present | Read-in 1 | |
| 4 | 1 | 800 | Wait | Row 1 | Present | Read-in 1 |
| 1 | 2 | 1000 | Read-in 2 | Wait | Row 1 | Present |
| 2 | 2 | 1200 | Present 2 | Read-in 2 | Wait | Row 1 |
| 3 | 2 | 1400 | | Present | Read-in 2 | Wait |
| 4 | 2 | 1600 | Wait | 2 | Present | Read-in 2 |
| 1 | 3 | 1800 | Read-in 3 | Wait | 2 | Present |
| 2 | 3 | 2000 | Present | Read-in 3 | Wait | 2 |
| 3 | 3 | 2200 | 3 | Present | Read-in 3 | Wait |
| 4 | 3 | 2400 | Wait | 3 | Present | Read-in 3 |
| 1 | 4 | 2600 | Read-in 4 | Wait | 3 | Present |
| 2 | 4 | 2800 | Present | Read-in 4 | Wait | 3 |
| 3 | 4 | 3000 | 4 | Present | Read-in 4 | Wait |
| 4 | 4 | 3200 | Wait | 4 | Present | Read-in 4 |
| | | | etc | | 4 | |

As may be seen from the table, certain presentation overlapping exists.

Figure 3:
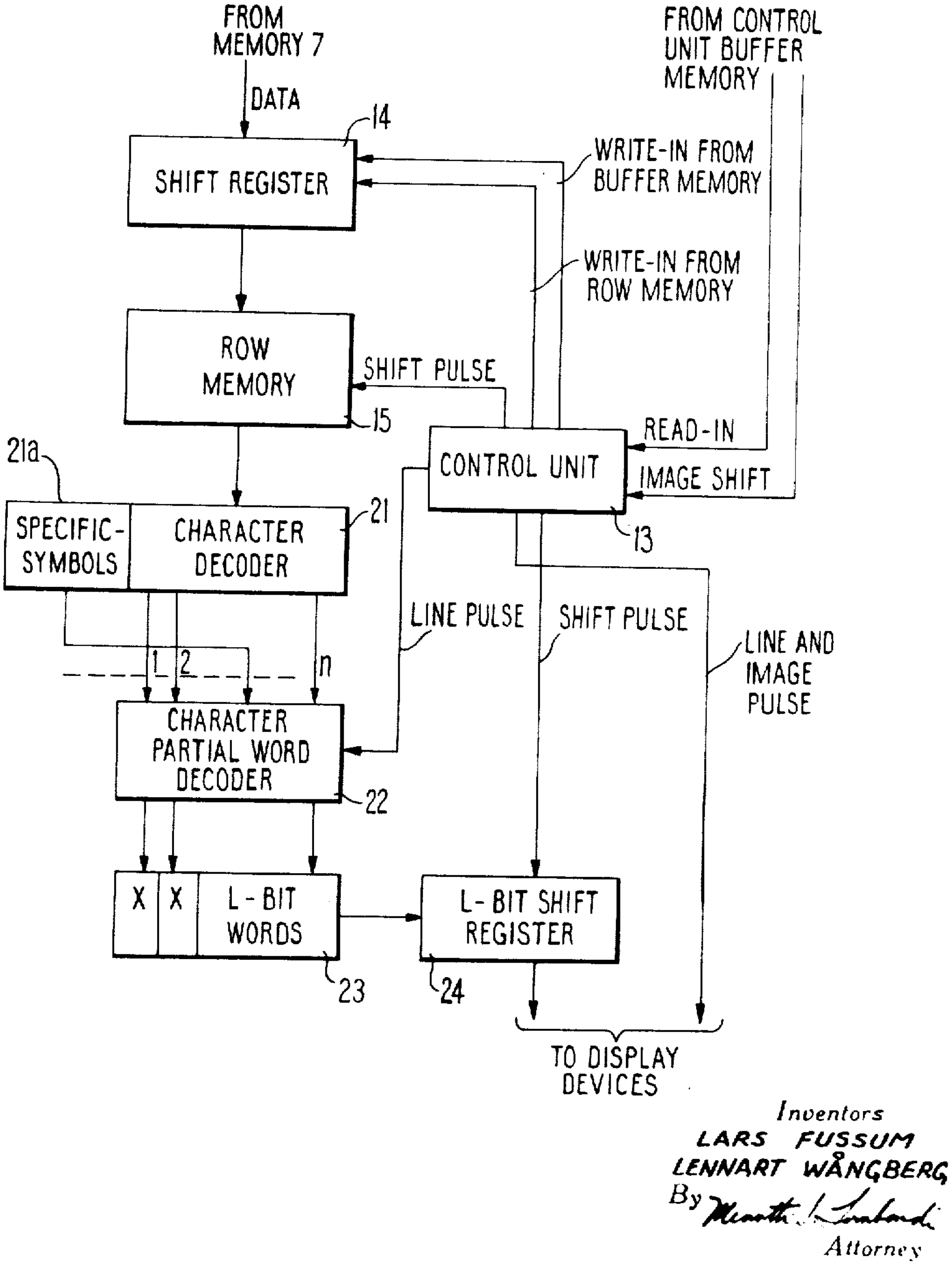
FIG. 3 illustrates the conversion of a computer row for presentation on a television screen.

In summary, and referring to FIGS. 2 and 3, the data lines are stored in the memory (7, 12). For each screen there is a row memory 15 including a number of shift registers connected in parallel. A counter which is positioned in the control unit 13 controls the distribution of data to the row memories 15. When data is shifted by register 14 from the memory (7, 12) into one of the row memories 15, the remaining memories are shifted at such a frequency that the contents of the memories are circulated one circumvolution for each television line scanning. When the feeding-in of a line into row memory $n$ is completed the circulation of this line is started and the generation of the video for the presentation of the line on screen $n$ can start. Simultaneously, the circulation of memory $n$+1 stops, the input thereof is connected to the memory (7, 12) and the row memory is shifted at the character frequency of the memory. Therefore, the generation of video on screen $n$+1 must have been completed, since the electron beam operates in a line space on screen $n$+1.

Thus, when having a total of N row memories, up to (N−1)/N × the dividing of line can be utilized by the character generator (21, 22, 23) to generate video for the presentation of a text-line on a screen. The rest has to be line spaces due to the fact that the row memory associated to the screen is occupied by the reception of a new line from the memory (7). Having four row memories and having a dividing of line corresponding to 16 television lines (for example) the presentation on screen 2 starts four lines below (after) screen 1. If each text line thus presented engages more than four lines overlapping will occur, sometimes the character generator must generate video for both screen 1 and screen 2 for the same television line scanning. If the character height would be more than 8 (i.e. from 9 to 12) lines number 1 would be overlapped also by number 3. Then the character generator would have to serve three screens at the same time. To each screen there is associated a shift register or video register 24 having at least the same total number of stages as the width of characters, counted in the total number of picture elements.

In the preferred embodiment of the invention the height of character is so selected that a maximum of two channels out of four overlap each other. The character generator common to all four channels is used by said two channels alternately.

Said character generator generates video information for all the picture elements simultaneously on the same vertical level within a character. This information is set in parallel in a video register 24. When this video is shifted out said character generator generates new information which is then set in the video register associated to the other (overlapping) channel.

Thus, as indicated above, regarding the dividing of line, said character generator generates the first line of a character on screen 2 after having generated the fifth line from the top of a character in a corresponding position on screen 1. Then it generates the fifth line of the character in the next position on screen 1 and then the first line of the next character on screen 2, and so on. When the drawing of the text-line on screen 1 is completed the generator continues to change between screens 2 and 3.

In FIG. 3 the symbol generator is illustrated more specifically with respect to the control function of the control unit and particularly with respect to the individual shift functions. When converting a symbol character code in the character decoder 21 to video pulses, first of all decoding is carried out over n individual outputs 1, 2 . . . ¯n. Herein n is equal to the number of different symbols. The individual outputs 1 . . . ¯n are gathered in common groups in a digit partial word decoder 22 that carries out decoding with regard to the line condition, i.e., the condition of the line that is to be presented on the image screen. From character partial word decoder 22 a matrix having a number of columns corresponding to the side bit resolution factor of the character mosaic is fed in conventional manner. By making use of this method it is thus possible to achieve a gain in components by utilization of redundancy. The semiconductors of the matrix row are positioned in such manner that the lighting and extinguishing pattern of a desired symbol character portion line is achieved, and the columns of matrix 23 thus provide this pattern as a condition to shift registers 24. One shift register is needed for each television set connected. The appropriate shift register 24 is set in parallel from control unit 13 with the video pattern of the desired character on the selected line. Thereafter shift register 24 is shifted out and the output signals are made to control the electron beam of the corresponding television set. The shift registers 24 are thus repeatedly set and shifted out synchronously with the circulation of the row memories 15 during the passthrough of the television line. In this manner the desired line pattern is achieved without the large matrix 21 having to operate with the high frequency of the control pulses of the television electron beam.

We claim:

1. Conversion device for data presentation received from a computer on a plurality of television screens, wherein the data is transferred over a transmission link to a series arranged adapting means, communicating device, image memory, symbol generator, and output control means for communication with said screens, the device including:

a magnetostrictive delay line in the form of a closed loop and adapted to store all data intended for presentation on all of said screens;

a central control and clock unit;

a shift register coupled to said delay line and actuated by clock pulses from said central unit, said register to couple a data row to be displayed on one of said screens to a following row memory;

said row memory comprising another shift register for circulating in a closed loop and synchronously with the repetition frequency of the line sweep the data content to be displayed on said one screen;

said other shift register circulates the data contents a given number of times in dependence on the row resolution factor of said one screen;

said data content is supplied from said row memory to a subsequently coupled character decoder and matrix under control of said central control unit; and said matrix provides video signals which under the control of said control unit are coupled to a signal generator for providing television input signals, whereby the presentation of data on each of said plurality of screens is carried out in a consecutive sequential order with a predetermined amount of presentation overlapping.

2. The device of claim 1 including a modulator unit coupled to said signal generator for providing display signals for said television screens.

3. In an arrangement for presentation of data on a plurality of television receivers with keyboards, wherein the data is received from a computer over a transmission link and coupled to a series arranged adapting and communicating means, image memory, symbol generator, and output control means for communication with said receivers, conversion means comprising:

an accoustical delay line memory formed in a closed loop and adapted to store all data intended for presentation on all screens of said receiver;

a control unit for providing individual shift pulses;

a shift register coupled to said delay line and actuated by shift pulses from said control unit to couple a data row to be displayed on one of said television receivers to a following row memory, said row memory comprising another shift register for circulating in a closed loop and synchronously with the repetition frequency of the line sweep of the television set the data content to be displayed on said one receiver;

a character decoder is coupled to the row memory for converting a symbol character code in the character decoder to video pulses, all the decoding is carried out on individual outputs equal to the number of different symbols;

said individual outputs are gathered in common groups in a following digit partial word decoder;

a matrix having a number of columns corresponding to the side bit resolution factor of the character mosaic is coupled to receive the outputs of said partial word decoder; and a plurality of shift register means, one for each television receiver, coupled to said matrix, whereby the appropriate shift register is set in parallel from said control unit with the video pattern of the desired character on the selected line.

4. The conversion means of claim 3 wherein said plurality of shift register means are repeatedly set and shifted out synchronously with the circulation of said row memories during the pass through of the television line.

5. The conversion means of claim 4 wherein the data content to be displayed on said one receiver is circulated a number of times depending on the row resolution factor of the line representation on said one receiver screen.

6. A device for presentation of data received from a computer on a plurality of television screens comprising in combination:

means for coupling said data from said computer;

memory means for storing the coupled data for representation on all of said television screens, said memory comprising a closed acoustic delay line wherein the data for representation is circulated;

a plurality of row memories, one for each of said television screens, coupled to said memory means and including shift registers, the row data contents of which are circulated in an individual closed data loop a given number of times depending on the row resolution factor of the television image for line representation on a corresponding television screen;

a specific shift register controlled from a central control unit and coupled to said row memories to extract each individual data row from said memory means, and each individual data row in a row memory is circulated synchronously with the repetition frequency of the line sweep of the television screen; and output generating means coupled to said screens for presenting each row of data in a consecutive sequence with a predetermined amount of presentation overlapping.

* * * * *